US 6,627,569 B1

(12) United States Patent
Naumann et al.

(10) Patent No.: US 6,627,569 B1
(45) Date of Patent: *Sep. 30, 2003

(54) GLASS WITH HIGH PROPORTION OF ZIRCONIUM-OXIDE AND ITS USES

(75) Inventors: Karin Naumann, Ober-Olm (DE); Norbert Greulich-Hickmann, Mainz (DE); Uwe Kolberg, Mainz-Kastel (DE); Werner Kiefer, Mainz (DE)

(73) Assignee: Schott Glas, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/869,818

(22) PCT Filed: Nov. 9, 2000

(86) PCT No.: PCT/EP00/01049

§ 371 (c)(1),
(2), (4) Date: Jul. 5, 2001

(87) PCT Pub. No.: WO00/48955

PCT Pub. Date: Aug. 24, 2000

(30) Foreign Application Priority Data

Feb. 15, 1999 (DE) .......................... 199 06 240

(51) Int. Cl.$^7$ .......................... C03C 3/087; C03C 13/02
(52) U.S. Cl. .......................... 501/70; 501/71; 501/38
(58) Field of Search .......................... 501/67, 68, 69, 501/70, 71, 38

(56) References Cited

U.S. PATENT DOCUMENTS

| 4,030,935 A | 6/1977 | Shults .......................... 501/64 |
| 4,065,317 A | 12/1977 | Baak .......................... 501/70 |
| 5,780,371 A | * 7/1998 | Rifqi et al. .................. 428/65.3 |
| 5,958,812 A | * 9/1999 | Koch et al. .................... 501/66 |

FOREIGN PATENT DOCUMENTS

| CZ | 236 744 | | 11/1986 | |
| DE | 2 323 932 | | 5/1973 | |
| DE | 2 406 888 | | 8/1974 | |
| DE | 26 14 395 | | 10/1976 | |
| DE | 27 29 706 | | 1/1979 | |
| DE | 29 27 445 | | 1/1980 | |
| DE | 30 09 953 | | 10/1980 | |
| DE | 17 96 339 | C3 | 12/1981 | |
| DE | 31 07 600 | A1 | 3/1982 | |
| DE | 293 105 | A1 | 10/1983 | |
| DE | 293105 | A | * 8/1991 | ........... C03C/13/02 |
| DE | 40 32 460 | A1 | 6/1992 | |
| EP | 0 446 064 | B1 | 3/1991 | |
| EP | 0 500 325 | A1 | 8/1992 | |
| GB | 1 191 162 | A | 5/1970 | |
| GB | 1 290 528 | | 9/1972 | |
| GB | 2 232 988 | A | 1/1991 | |
| JP | 62-13293 | | 3/1987 | |
| SU | 1413063 | | * 1/1987 | |

OTHER PUBLICATIONS

English translation attached to DD293 105 A5, Forkel et al.*

* cited by examiner

*Primary Examiner*—David Sample
*Assistant Examiner*—Elizabeth Bolden
(74) *Attorney, Agent, or Firm*—Michael J. Striker

(57) ABSTRACT

The silicate glass has a composition (in % by weight, based on oxide) of $SiO_2$, 54–72; $Al_2O_3$, 0.5–7; $ZrO_2$, >10–<18; $B_2O_3$, 0–<5; $Na_2O$, 2–<10; $K_2O$, 0–5; with $Na_2O+K_2O$, 2–<10; CaO, 3–11; MgO, 0–10; SrO, 0–8; BaO, 0–12; with $CaO+MgO+SrO+BaO$, >5–24; $La_2O_3$, 0–6; and $TiO_2$, 0–4. The glass has at least 0.6% by weight of $La_2O_3$ or at least 0.1% by weight $TiO_2$. The glass is in hydrolytic glass 1, acid class 3 or better, preferably acid class 1, and lye class 1. It has a glass transition temperature ($T_g$) of at least 640° C., a thermal expansion coefficient ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to –0.0130.

11 Claims, No Drawings

GLASS WITH HIGH PROPORTION OF ZIRCONIUM-OXIDE AND ITS USES

BACKGROUND OF THE INVENTION

1. Field of the Invention

The invention relates to a glass having a high zirconium oxide content, and to uses thereof.

2. Description of the Related Art

Glasses having a high zirconium oxide content have mainly been described in connection with alkali-resistant glass fibers for concrete reinforcement. Compared with E-glass, a substantially alkali-free aluminoborosilicate glass, fibers made from known $ZrO_2$-containing glasses do have higher alkali resistance, but, in particular, their resistance in cement over a long period is inadequate. The alkali resistance of concrete-reinforcing fibers is of importance and is therefore usually to the fore during glass development, since the cement sets under highly alkaline conditions (pH values up to about 12.5). Besides the alkali resistance, however, the other chemical resistance, in particular the hydrolytic resistance, is clearly also of importance for long-term use as a reinforcing agent in concrete since it improves the long-term resistance.

Glasses which exhibit high resistance both to water, acids and caustic lyes are interesting for a wide variety of applications, for example for pharmaceutical packaging or for inspection windows in process tanks, in particular if they additionally have high heat resistance.

A feature for high heat resistance is a high glass transition temperature $T_g$. In glasses having a high $T_g$, experience has shown that the so-called compaction (shrinkage) is low. This is shrinkage of glass parts during temperature treatment below the $T_g$, a property which can only be determined with sufficient accuracy with great experimental complexity and is of importance, for example, for applications in which very strict standards are set for the shape fidelity of the glass parts, for example for applications in display technology.

For optical applications, glasses having high negative anomalous partial dispersion in the blue spectral region ($\Delta P_{g,F}$) are extremely interesting for correction of image aberrations. A disadvantage of the glasses in this series that have been disclosed hitherto is that they either have large amounts of PbO, which is undesired from environmental points of view, and have poor chemical resistance or that large amounts of the very expensive raw materials $Nb_2O_5$ and in particular $Ta_2O_5$ have to be used for lead-free substitution products, which makes economical manufacture much more difficult. Lead-free glasses of this type are disclosed in DE-A 27 29 706.

SUMMARY OF THE INVENTION

A wide variety of specifications in the patent literature which describe alkali-resistant glasses having high $ZrO_2$ contents are also already known, but these still have disadvantages.

British Patent Specification GB 1,290,528 describes glass compositions for the production of glass fibers which comprise from 13 to 23 mol % of $R_2O$ (0–2% of $Li_2O$, remainder $Na_2O$). Glasses having such a high alkali metal content, as also occur in European Patent Specification EP 0 446 064 B1, which describes glass fiber materials for components of exhaust systems for internal-combustion engines (13–18% by weight of $Na_2O+K_2O$), exhibit poor hydrolytic resistance.

The same applies to the glass fibers in accordance with DE 17 96 339 C3 based on a glass comprising 11% by weight of $Na_2O$ and 1% by weight of $Li_2O$ and to the glasses converted into fibers in DE 40 32 460 A1, comprising 10–15% by weight of $Na_2O$ and 0.1–2% by weight of $K_2O$.

The glass compositions from German Laid-Open Specification DE-A 2 406 888, which likewise have a high alkali metal content (10–25% by weight of $R_2O$), comprise up to 20% by weight of oxides of the rare earth metals, for example cerium oxide or also naturally occurring mixtures of these oxides.

Rare-earth metal oxides, to be precise together with $TiO_2$ in an amount of 0.5–16% by weight, where the $TiO_2$ content is at most 10% by weight of the glass, are also present in the glasses from German Laid-Open Specification DE 31 07 600 A1. They furthermore comprise 0.1–1% by weight of $Cr_2O_3$. An essential aspect here is that the chromium is substantially in the trivalent state.

German Laid-Open Specification DE-A 26 14 395 describes $Al_2O_3$-free glasses, which have to comprise 0.5–10% by weight of $Cr_2O_3+SnO_2$ for their alkali resistance, components which have the following disadvantages: $Cr_2O_3$ only dissolves in the glass flux with difficulty, and problems can also occur on use of chromium salts due to "chromium knots". $SnO_2$ is a good nucleating agent and therefore promotes crystallization. The glasses furthermore require 0.05–1% by weight of $SO_3$ as melt assistant, which can result in interfering foam and blow-hole formation.

DE-A 30 09 953 describes glass fibers which, besides $ZrO_2$, must contain $ThO_2$. This component is necessary in order to achieve alkali resistance. Owing to its radio-activity, however, it is desirable to be able to omit this component.

EP 0 500 325 A1 discloses glass fibers containing 5–18 mol % of $TiO_2$. Their resultant chemical resistance is achieved at the expense of very high susceptibility to crystallization, which is particularly disadvantageous with respect to the spinnability of the glass melt to give fibers.

The Patent Specification DD 293 105 A5 describes a process for the production of highly alkali-resistant glass fibers and products produced therefrom, in which the glass melt to be spun, besides $SiO_2$, $R_2O_3$, $ZrO_2$, RO and $R_2O$ ($K_2O$, $Na_2O$ and/or $Li_2O$), also contains fluoride. This fluxing agent can only be omitted if $Li_2O$ is present.

JP 62/13293 B2 describes glass compositions containing at least 5% by weight of $B_2O_3$ for the core glass and cladding of glass fibers. $ZrO_2$ is merely an optional component. Although these glasses have high water resistance, this cannot, however, be guaranteed over the entire composition range owing to the high $B_2O_3$ contents at the same time as relatively high alkali metal contents, since water-soluble alkali metal borate phases can easily form.

DE-A 2 323 932 describes glass fibers which contain both $P_2O_5$ and also $B_2O_3$ in addition to very high contents of $ZrO_2$ (8–16 mol %). The alkali metal content can vary within a broad range (1.5–25 mol %). Although such a high $ZrO_2$ content greatly increases the alkali resistance, $P_2O_5$ reduces it again however. In addition, the hydrolytic resistance cannot be adequate over the entire composition range.

GB 2 232 988 A describes $ZrO_2$-containing glass fibers which are coated with a thermoplastic resin in order to improve their alkali resistance. Owing to this additional process step, fibers of this type can only be produced expensively and in a complex manner. Fiber materials which can be used are glass fibers from the $SiO_2$—$ZrO_2$—$R_2O$ system with a fairly large variation latitude of the components and with further merely optional components, since, owing to the coating, the corresponding properties of the glass lose importance.

DE-A 29 27 445 describes glass compositions having high $ZrO_2$ contents, namely 18–24% by weight. Although the glasses consequently have high alkali resistance, a high content has, however, an adverse effect on the processing properties and devitrification stability.

By contrast, CZ 236 744 describes glass fibers made from mineral raw materials for cement reinforcement which contain only from 5 to 10% by weight of $ZrO_2$, a content with which high alkali resistance can only be achieved with difficulty.

It is an object of the invention to provide a glass which has not only high caustic lye resistance, but also high hydrolytic resistance and good acid resistance and which has high heat resistance and good processing properties.

This object is achieved by the glass having a high zirconium oxide content which is described in the main claim.

The glass according to the invention comprises from 54 to 72% by weight of $SiO_2$. At higher contents, the meltability would be impaired, while at lower contents, glass formation would be more difficult. At least 55% by weight are particularly preferred.

$Al_2O_3$, present in amounts of from 0.5 to 7% by weight, particularly preferably up to 6% by weight, likewise serves to improve glass formation and makes a significant contribution toward improving the chemical resistance. However, excessively high contents would, in particular in the case of $ZrO_2$-rich and low-$R_2O$ compositions, result in an increased tendency toward crystallization. With increasing content of $Al_2O_3$, the $ZrO_2$ solubility drops indirectly; however, this can be countered within the given limits by the presence of the alkali metal oxides. It is therefore preferred for the $Al_2O_3/Na_2O$ weight ratio to be <1.64, which corresponds to an $Al_2O_3/Na_2O$ molar ratio of <1. It is particularly preferred for not only the $Al_2O_3/Na_2O$ ratio, but also the $Al_2O_3/R_2O$ ratio to be <1.

An essential aspect for the high alkali resistance is the $ZrO_2$ content of the glass. It is therefore at least >10% by weight. The maximum content is restricted to <18% by weight, since otherwise the devitrification tendency increases excessively. The occurrence of $ZrO_2$ crystals would result in glass flaws. The maximum content is preferably restricted to <12% by weight.

The alkali metal oxide(s) (2–<10% by weight of $Na_2O$, preferably 3–<10% by weight, and 0–5% by weight of $K_2O$, with 2–<10% by weight of $Na_2O+K_2O$, preferably 3–<10% by weight) serve(s) to improve the meltability and enable the high $ZrO_2$ contents, since they increase the solubility of the $ZrO_2$ in the glass. However, if the alkali metal contents are too high, the hydrolytic resistance, in particular, and to a lesser extent the caustic lye resistance would be impaired. It is preferred for both $Na_2O$ and $K_2O$ to be present.

Of the alkaline earth metal oxides, which are present in the glass to the extent of greater than 5% by weight and at most 24% by weight, CaO is present in an amount of 3–11% by weight, preferably 3–10% by weight, while MgO is present in an amount of 0–10% by weight, SrO in an amount of 0–8% by weight and BaO in an amount of 0–12% by weight, preferably 0–10% by weight, are optional components.

The alkaline earth metal oxides reduce the melt viscosity, suppress crystallization and also contribute toward an improvement in the alkali resistance. BaO in particular reduces the tendency toward crystallization. If the alkaline earth metal oxide content were too low, the meltability and processing properties in the glasses would be impaired excessively, and they could no longer be converted into fibers, and the $ZrO_2$ solubility would also be too low. At a content greater than the maximum content mentioned, the glasses would devitrify, and crystallization would likewise occur. A total content of alkaline earth metal oxides of at most 23% by weight is preferred.

$B_2O_3$ is an optional component and improves the meltability by reducing the viscosity. However, its content should remain restricted to less than 5% by weight, since $B_2O_3$ impairs the alkali metal resistance and in particular the acid resistance. It is preferred to restrict the maximum $B_2O_3$ content to 4% by weight.

The glass may furthermore comprise 0–4% by weight of $TiO_2$ and 0–6% by weight, preferably 0–5% by weight, of $La_2O_3$. Addition of $La_2O_3$ improves the meltability of the glass, broadens the glass formation range and increases the refractive index. $La_2O_3$ and $TiO_2$ principally contribute toward an improvement in the hydrolytic and caustic lye resistance, with $La_2O_3$ being more effective than $TiO_2$. Excessive contents of $La_2O_3$ and $TiO_2$ reduce the acid resistance and result in crystallization.

A particularly preferred group of glasses according to the invention is the $B_2O_3$-free glasses of the following composition range (in % by weight, based on oxide): $SiO_2$ 58–71; $Al_2O_3$ 0.5–<2.3; $ZrO_2$ >10–<18; $Na_2O$ 2–9 (preferably 2–8); $K_2O$ 0–3, with $Na_2O+K_2O$ 2–<10, CaO 3–11 (preferably 3–9); MgO 0–2.6, SrO 0–6; BaO 0–9, with CaO+MgO+SrO+BaO>5–24, $La_2O_3$ 0–1.

Besides the very high caustic lye and hydrolytic resistance inherent in all the glasses according to the invention, these glasses also have very high acid resistance. They belong not only to caustic lye class 1 and hydrolytic class 1, but also to acid class 1.

The glass may furthermore comprise up to 2% by weight, preferably up to 1% by weight, of each of $Fe_2O_3$, $MnO_2$ and $CeO_2$, where the sum of these three components should also not exceed 2% by weight, preferably should not exceed 1% by weight. These compounds are the usual impurities in naturally occurring raw materials of the glass constituents. In particular on use of the glasses according to the invention for the production of fibers for concrete reinforcement, inexpensive raw materials are of importance. On use of the glasses for optical purposes, the requirements of the purity of the glasses and thus of the purity of the raw materials are generally significantly greater. Here, the said sum and in particular the $Fe_2O_3$ content are preferably below 0.005% by weight.

For fining, the glasses may comprise conventional fining agents in conventional amounts, thus, for example, arsenic oxide, antimony oxide, chlorides, for example as $CaCl_2$ or $BaCl_2$, or, as preferred, $SnO_2$. Fluoride is preferably omitted in all these glasses, but in particular in those having high $ZrO_2$ contents ($\geq 12$% by weight). At the high melt temperatures of $ZrO_2$-rich glasses, the effort in avoiding environmentally harmful emissions would be very high.

EXAMPLES

Twenty examples of glasses according to the invention were melted from conventional raw materials in Pt/Rh crucibles and cast to give blocks. In addition, fibers were drawn by the re-drawing method.

Table 1 shows the composition (in % by weight, based on oxide) of the glasses and their main properties. These are the coefficient of thermal expansion $\alpha_{20/300}$ [$10^{-6}$/K], the glass transition temperature $T_g$ [°C.], the working point $V_A$ [°C.], the density $\rho$ [g/cm$^3$], the modulus of elasticity E [GPa], the temperature at which the glass has an electrical volume resistivity of $10^8$ Ωcm, $T_{K100}$ [°C.], and the hydrolytic resistance H in accordance with DIN/ISO 719 [μg of Na$_2$O/g], the acid resistance S in accordance with DIN 12116 [mg/dm$^2$] and the lye resistance L in accordance with ISO 675 (=DIN 52322) [mg/dm$^2$]. Also shown are the optical data, the refractive index $n_d$, the Abbe number $\nu_d$ and the anomalous partial dispersion in the blue region of the spectrum $\Delta P_{g,F}$. Table 1 does not show the fining agents, whose contents correspond to the respective remainder to 100%.

TABLE 1

Composition (in % by weight, based on oxide) and main properties of example glasses

| | A1 | A2 | A3 | A4 | A5 |
|---|---|---|---|---|---|
| SiO$_2$ | 65.8 | 69.7 | 55.0 | 63.4 | 69.9 |
| Al$_2$O$_3$ | 1.0 | 1.0 | 1.0 | 1.0 | 1.0 |
| B$_2$O$_3$ | — | — | — | 1.0 | — |
| ZrO$_2$ | 10.1 | 10.1 | 11.0 | 11.5 | 11.9 |
| BaO | — | 1.0 | 10.0 | 3.1 | — |
| CaO | 8.0 | 4.0 | 8.0 | 5.3 | 4.0 |
| MgO | 1.0 | 1.0 | — | 1.2 | 10.0 |
| SrO | — | — | — | 3.8 | — |
| Na$_2$O | 8.0 | 3.0 | 6.8 | 5.9 | 3.0 |
| K$_2$O | 1.0 | 5.0 | 3.0 | 2.9 | — |
| La$_2$O$_3$ | 5.0 | 5.0 | 5.0 | 0.7 | — |
| TiO$_2$ | — | — | — | — | — |
| $\alpha_{20/300}$ [$10^{-6}$/K] | 6.68 | 5.36 | 7.94 | 6.71 | 4.49 |
| Tg [°C.] | 671 | 730 | 648 | 700 | 741 |
| V$_A$ [°C.] | 1148 | 1329 | 1119 | 1174 | 1325 |
| ρ [g/cm$^3$] | 2.719 | 2.648 | 2.960 | 2.751 | 2.633 |
| E [GPa] | 83 | 80 | 85 | 84 | 88 |
| T$_{K100}$ [°C.] | 212 | 284 | n.m. | n.m. | 336 |
| H [μg Na$_2$O/g] | 25 | 12 | 20 | 15 | 17 |
| S [mg/dm$^2$] | 0.9 | 1 | 1.9 | 3.1 | 1.3 |
| L [mg/dm$^2$] | 10 | 12 | 13 | 8 | 18 |
| $n_d$ | 1.55789 | 1.54027 | 1.58757 | n.m. | 1.54953 |
| $\nu_d$ | 55.63 | 57.25 | 53.74 | n.m. | 65.51 |
| $\Delta P_{g,F}$ | −0.0053 | −0.0046 | −0.0030 | n.m. | n.m. |

| | A6 | A7 | A8 | A9 | A10 |
|---|---|---|---|---|---|
| SiO$_2$ | 67.6 | 65.5 | 54.8 | 54.8 | 54.7 |
| Al$_2$O$_3$ | 0.5 | 5.0 | 1.0 | 6.2 | 6.0 |
| B$_2$O$_3$ | — | — | — | — | — |
| ZrO$_2$ | 17.0 | 17.0 | 10.3 | 17.8 | 10.1 |
| BaO | — | — | 4.0 | — | 4.0 |
| CaO | 5.0 | 5.0 | 8.0 | 8.0 | 4.0 |
| MgO | 2.5 | — | 10.0 | 1.0 | 8.0 |
| SrO | — | — | — | — | — |
| Na$_2$O | 7.2 | 7.2 | 3.0 | 3.0 | 8.0 |
| K$_2$O | — | — | 5.0 | 5.0 | — |
| La$_2$O$_3$ | — | — | — | — | 5.0 |
| TiO$_2$ | — | — | 3.7 | 4.0 | — |
| $\alpha_{20/300}$ [$10^{-6}$/K] | 5.30 | 5.36 | 7.05 | 6.30 | 6.90 |
| Tg [°C.] | 738 | 784 | 685 | 757 | 681 |
| V$_A$ [°C.] | n.m. | n.m. | 1085 | 1296 | 1119 |
| ρ [g/cm$^3$] | n.m. | n.m. | 2.841 | 2.801 | 2.864 |
| E [GPa] | n.m. | 83 | 91 | 87 | 89 |
| T$_{K100}$ [°C.] | n.m. | n.m. | 436 | 263 | 189 |
| H [μg Na$_2$O/g] | 16 | 16 | 30 | 13 | 23 |
| S [mg/dm$^2$] | 0.6 | 0.9 | 4.5 | 13 | 4.6 |
| L [mg/dm$^2$] | 9 | 13 | 20 | 13 | 10 |
| $n_d$ | 1.56065 | n.m. | 1.59842 | 1.59772 | 1.57737 |
| $\nu_d$ | 54.25 | n.m. | 49.73 | 47.57 | 54.41 |
| $\Delta P_{g,F}$ | −0.0071 | n.m. | −0.0043 | −0.0040 | −0.0052 |

| | A11 | A12 | A13 | A14 | A15 |
|---|---|---|---|---|---|
| SiO$_2$ | 69.5 | 70.0 | 54.8 | 54.9 | 64.8 |
| Al$_2$O$_3$ | 1.0 | 1.0 | 1.0 | 1.0 | 2.0 |
| B$_2$O$_3$ | — | — | — | — | — |
| ZrO$_2$ | 17.0 | 17.0 | 17.9 | 17.9 | 17.0 |
| BaO | — | 3.0 | 10.0 | 0.3 | 8.0 |
| CaO | 5.0 | 5.0 | 4.3 | 4.0 | 3.0 |
| MgO | — | — | — | 10.0 | — |
| SrO | — | — | — | — | — |
| Na$_2$O | 7.2 | 3.7 | 7.8 | 7.7 | 2.0 |
| K$_2$O | — | — | — | — | 3.0 |

TABLE 1-continued

Composition (in % by weight, based on oxide) and main properties of example glasses

|  | | | | | |
|---|---|---|---|---|---|
| $La_2O_3$ | — | — | — | — | — |
| $TiO_2$ | — | — | 4.0 | 4.0 | — |
| $\alpha_{20/300}$ [$10^{-6}$/K] | 5.10 | 4.13 | 6.30 | 6.51 | 4.60 |
| $T_g$ [° C.] | 747 | 802 | 730 | 695 | 821 |
| $V_A$ [° C.] | 1326 | 1405 | 1203 | 1026 | 1390 |
| $\rho$ [g/cm$^3$] | 2.664 | 2.687 | 2.937 | 2.873 | 2.787 |
| E [GPa] | 84 | 86 | 88 | 95 | 85 |
| $T_{K100}$ [° C.] | n.m. | n.m. | 205 | 238 | 300 |
| H [$\mu$g $Na_2$O/g] | 14 | 7 | 17 | 10 | 8 |
| S [mg/dm$^2$] | 0.4 | 0.5 | 1.3 | 1.3 | 0.4 |
| L [mg/dm$^2$] | 10 | 13 | 9 | 19 | 11 |
| $n_d$ | 1.55395 | 1.55792 | 1.6012 | n.m. | 1.56136 |
| $v_d$ | 54.27 | 54.25 | n.m. | n.m. | 55.28 |
| $\Delta P_{g,F}$ | −0.0117 | −0.0075 | n.m. | n.m. | n.m. |

|  | A16 | A17 | A18 | A19 | A20 |
|---|---|---|---|---|---|
| $SiO_2$ | 59.9 | 57.5 | 64.7 | 55.6 | 69.9 |
| $Al_2O_3$ | 1.0 | 1.0 | 2.0 | 1.0 | 1.0 |
| $B_2O_3$ | — | 3.8 | — | — | — |
| $ZrO_2$ | 17.9 | 17.3 | 17.0 | 15.1 | 10.1 |
| BaO | 4.0 | 3.8 | — | 9.3 | 1.2 |
| CaO | 8.0 | 7.7 | 3.0 | 7.7 | 8.0 |
| MgO | 1.0 | 1.0 | — | — | — |
| SrO | — | — | 8.0 | — | 5.1 |
| $Na_2O$ | 8.0 | 7.7 | 2.0 | 6.8 | 3.6 |
| $K_2O$ | — | — | 3.0 | 1.0 | 0.5 |
| $La_2O_3$ | — | — | — | 3.2 | 0.6 |
| $TiO_2$ | — | — | — | 0.1 | — |
| $\alpha_{20/300}$ [$10^{-6}$/K] | 6.42 | 6.29 | 4.82 | 7.11 | 5.17 |
| $T_g$ [° C.] | 725 | 672 | 822 | 700 | 731 |
| $V_A$ [° C.] | 1195 | 1151 | 1371 | 1163 | 1233 |
| $\rho$ [g/cm$^3$] | 2.860 | 2.836 | 2.788 | 2.984 | 2.702 |
| E [GPa] | 90 | 89 | 85 | 88 | 84 |
| $T_{K100}$ [° C.] | 213 | 371 | 303 | 235 | 260 |
| H [$\mu$g $Na_2$O/g] | 17 | 16 | 6 | 9 | 12 |
| S [mg/dm$^3$] | 0.6 | 1.8 | 0.9 | 1.2 | 0.3 |
| L [mg/dm$^2$] | 9 | 9 | 8 | 7 | 18 |
| $n_d$ | 1.58632 | 1.58415 | 1.5644 | n.m. | 1.54758 |
| $v_d$ | 52.69 | 53.19 | n.m. | n.m. | 57.00 |
| $\Delta P_{g,F}$ | −0.0066 | −0.0070 | n.m. | n.m. | −0.0050 | n.m. = not measured

The glasses according to the invention have high chemical resistances:

On determination of the hydrolytic resistance H in accordance with DIN/ISO 719, in which the base equivalent of the acid consumption is given as $\mu$g of $Na_2$O/g of glass grit, a value of 31 means that a glass belongs to hydrolytic class 1 ("highly chemically resistant glass"). This is satisfied for the glasses according to the invention.

On determination of the caustic lye resistance in accordance with ISO 695 (=DIN 52322), a weight loss of up to 75 mg/dm$^2$ means that the glass belongs to lye class 1 ("weakly lye-soluble"), which is satisfied for the glasses according to the invention.

On determination of the acid resistance S in accordance with DIN 12116, a weight loss of up to 0.7 mg/dm$^2$ means that the glass belongs to acid class 1 ("acid resistant"), from more than 0.7 to 1.5 mg/dm$^2$ means that the glass belongs to acid class 2 ("weakly acid-soluble") and from >1.5 to 15 mg/dm$^2$ means that the glass belongs to acid class 3 ("moderately acid-soluble"). The glasses according to the invention belong to acid class 3 or better.

The glasses which belong to acid class 1 (see by way of example glasses A6, A11, A12, A15, A16 and A20) are thus so-called 1-1-1 glasses, i.e. they belong to class 1 in each of the three aspects of chemical resistance.

The glasses are very highly suitable as container glass, especially for chemically aggressive substances, in particular liquids.

The glasses according to the invention have high transition temperatures $T_g$ of at least 640° C. They are thus suitable for uses in which highly thermally resistant glasses are required, for example also as components of parts in exhaust systems with catalytic converters which are subjected to high temperatures. Owing to their low compaction, which is associated with a high transition temperature, the glasses are also highly suitable for use as substrate glasses in display technology.

The glasses according to the invention have coefficients of thermal expansion $\alpha_{20/300}$ of from $4.1 \times 10^{-6}$/K to $8.0 \times 10^{-6}$/K and are thus fusible to tungsten and molybdenum and are highly suitable as fusing glass for these metals.

The glasses can be chemically tempered by ion exchange, as a result of which they are also highly suitable for applications in which increased shatter resistance is important, for example as substrates for EDP storage media.

The glasses according to the invention can readily be converted into glass fibers. Owing to the good chemical resistance of the glasses, which results in increased long-term durability, these glass fibers are extremely suitable for the reinforcement of concrete parts. Both use as short fibers and as continuous fibers (production of concrete/glass fiber composites) is possible.

The glasses have good processing properties. For example, they can be converted into blocks, sheets, rods, tubes and fibers and can also be employed in these forms, depending on the application.

The optical data of the glasses, namely a refractive index $n_d$ of from 1.53 to 1.63, an Abbe number $v_d$ of from 47 to 66 and in particular a negative deviation of the partial dispersion from the perpendicular (=negative anomalous partial dispersion) in the blue spectral region $\Delta P_{g,F}$ of up to −0.0130 also make them interesting for optical applications, for example for glasses for the correction of chromatic aberrations.

It is surprising that, besides the good properties described with respect to thermal, mechanical and chemical parameters, the glasses also have very interesting optical properties, in particular a negative anomalous partial dispersion in the blue spectral region ($\Delta P_{g,F}$). It has hitherto only been known here that this property is caused in combination with relatively low Abbe numbers (glasses of the flint type $v_d$<about 55) by PbO, $Nb_2O_5$ and $Ta_2O_5$. In glasses having a high Abbe number (crown type $v_d$>about 55), this property can also be caused by the alkaline earth metal oxides MgO—BaO and rare-earth elements $La_2O_3$, $Gd_2O_3$, $Yb_2O_3$, $Lu_2O_3$, etc., often in combination with the glass former $B_2O_3$.

For the first time, glasses having a negative $\Delta P_{g,f}$ with low to moderate Abbe numbers which have relatively low concentrations of alkaline earth metal oxides, $B_2O_3$ and, if desired, $La_2O_3$ as rare-earth metal oxide and are free from the expensive components $Nb_2O_5$ and $Ta_2O_5$ are now available here.

What is claimed is:

1. A silicate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <12 |
| $B_2O_3$ | 0 to <5 |
| CaO | 3 to 11 |
| MgO | 0 to 10 |
| SrO | 0 to 8 |
| BaO | 0 to 12 |
| CaO + MgO + SrO + BaO | >5 to 24 |
| $Na_2O$ | 2 to <10 |
| $K_2O$ | 0 to 5 |
| $Na_2O + K_2O$ | 2 to <10 |
| $La_2O_3$ | 0 to 6 |
| $TiO_2$ | 0 to 4, | and optionally at least one fining agent in an amount sufficient for fining; and wherein either said $TiO_2$ is present in amounts greater than 0.1 percent by weight or said $La_2O_3$ is present in amounts greater than 0.6 percent by weight; and wherein said at least one fining agent does not include any fluoride.

2. The silicate glass as defined in claim 1, and having a hydrolytic resistance in hydrolytic class 1, an acid resistance in acid class 3 or better, a caustic lye resistance in lye class 1, a glass transition temperature ($T_g$) of at least 640° C., a coefficient of thermal expansion ($\alpha_{20/300}$) of $4.1 \times 10^{-6}$/K, a refractive index ($n_d$) of 1.53 to 1.63, an Abbé number ($v_d$) of 47 to 66 and a negative. anomalous partial dispersion in a blur spectral region ($\Delta P_{g,F}$) of up to −0.0130.

3. A silicate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <18 |
| $B_2O_3$ | 0 to 4 |
| CaO | 3 to 10 |
| MgO | 0 to 10 |
| SrO | 0 to 8 |
| BaO | 0 to 10 |
| CaO + MgO + SrO + BaO | >5 to 23 |
| $Na_2O$ | 3 to <10 |
| $K_2O$ | 0 to 5 |
| $Na_2O + K_2O$ | 3 to <10 |
| $La_2O_3$ | 0 to 5 |
| $TiO_2$ | 0 to 4, | and optionally at least one fining agent in an amount sufficient for fining; and wherein either said $TiO_2$ is present in amounts greater than 0.1 percent by weight or said $La_2O_3$ is present in amounts greater than 0.6 percent by weight; and wherein said at least one fining agent does not include any fluoride.

4. The silicate glass as defined in claim 3, and having a hydrolytic resistance in hydrolytic class 1, an acid resistance in acid class 3 or better, a caustic lye resistance in lye class 1, a glass transition temperature ($T_g$) of at least 640° C., a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

5. A silicate glass having a high zirconium oxide content and a composition consisting of, in percent by weight based on oxide content:

| | |
|---|---|
| $SiO_2$ | 58 to 71 |
| $Al_2O_3$ | 0.5 to <2.3 |
| $ZrO_2$ | >10 to <18 |
| CaO | 3 to 11 |
| MgO | 0 to 2.6 |
| SrO | 0 to 6 |
| BaO | 0 to 9 |
| CaO + MgO + SrO + BaO | >5 to 24 |
| $Na_2O$ | 2 to 9 |
| $K_2O$ | 0 to 3 |
| $Na_2O + K_2O$ | 2 to <10 |
| $La_2O_3$ | 0.6 to 1, | and optionally at least one fining agent in an amount sufficient for fining; and wherein said at least one fining agent does not include any fluoride.

6. The silicate glass as defined in claim 5, and having a hydrolytic resistance in hydrolytic class 1, an acid resistance in acid class 1, a caustic lye resistance in lye class 1, a glass transition temperature ($T_g$) of at least 640° C., a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

7. An optical glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <18 |
| $B_2O_3$ | 0 to <5 |
| CaO | 3 to 11 |
| MgO | 0 to 10 |
| SrO | 0 to 8 |
| BaO | 0 to 12 |
| CaO + MgO + SrO + BaO | >5 to 24 |
| $Na_2O$ | 2 to <10 |
| $K_2O$ | 0 to 5 |
| $Na_2O + K_2O$ | 2 to <10 |
| $La_2O_3$ | 0 to 6 |
| $TiO_2$ | 0 to 4 |
| $Fe_2O_3$ | <0.005, | and optionally at least one fining agent in an amount sufficient for fining; and wherein either said $TiO_2$ is present in amounts greater than 0.1 percent by weight or said $La_2O_3$ is present in amounts greater than 0.6 percent by weight, said at least one fining agent does not include any fluoride and said optical glass has a hydrolytic resistance in hydrolytic class 1, an acid resistance in acid class 3 or better, a caustic lye resistance in lye class 1, a glass transition temperature ($T_g$) of at least 640° C., a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

8. A substrate glass for electronic data processing devices, wherein said substrate glass is made by a process comprising chemically tempering a silicate glass by ion exchange, said silicate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <18 |
| $B_2O_3$ | 0 to <5 |
| CaO | 3 to 11 |
| MgO | 0 to 10 |
| SrO | 0 to 8 |
| BaO | 0 to 12 |
| CaO + MgO + SrO + BaO | >5 to 24 |
| $Na_2O$ | 2 to <10 |
| $K_2O$ | 0 to 5 |
| $Na_2O + K_2O$ | 2 to <10 |
| $La_2O_3$ | 0 to 6 |
| $TiO_2$ | 0 to 4, | and optionally at least one fining agent in an amount sufficient for fining; and wherein either said $TiO_2$ is present in amounts greater than 0.1 percent by weight or said $La_2O_3$ is present in amounts greater than 0.6 percent by weight, said at least one fining agent does not include any fluoride and said silicate glass has a hydrolytic resistance in hydrolytic class 1, an acid resistance in acid class 3 or better, a caustic lye resistance in lye class 1, a glass transition temperature ($T_g$) of at least 640° C., a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

9. A glass fiber for reinforcing concrete, said glass fiber being made by a method comprising converting silicate glass, said silicate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <18 |
| $B_2O_3$ | 0 to <5 |
| CaO | 3 to 11 |
| MgO | 0 to 10 |
| SrO | 0 to 8 |
| BaO | 0 to 12 |
| CaO + MgO + SrO + BaO | >5 to 24 |
| $Na_2O$ | 2 to <10 |
| $K_2O$ | 0 to 5 |
| $Na_2O + K_2O$ | 2 to <10 |
| $La_2O_3$ | 0 to 6 |
| $TiO_2$ | 0 to 4, | and optionally at least one fining agent in an amount sufficient for fining; and wherein either said $TiO_2$ is present in amounts greater than 0.1 percent by weight or said $La_2O_3$ is present in amounts greater than 0.6 percent by weight, said at least one fining agent does not include any fluoride and said silicate glass has a hydrolytic resistance in hydrolytic class 1, an acid resistance in acid class 3 or better, a caustic lye resistance in lye class 1, a glass transition temperature ($T_g$) of at least 640° C. an a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

10. A chemically resistant glass for reactive liquids, said chemically resistant glass having a high zirconium oxide content and a composition consisting of, in percent by weight based on oxide content:

| | |
|---|---|
| $SiO_2$ | 58 to 71 |
| $Al_2O_3$ | 0.5 to <2.3 |
| $ZrO_2$ | >10 to <18 |
| CaO | 3 to 11 |
| MgO | 0 to 2.6 |
| SrO | 0 to 6 |
| BaO | 0 to 9 |
| CaO + MgO + SrO + BaO | >5 to 24 |
| $Na_2O$ | 2 to 9 |
| $K_2O$ | 0 to 3 |
| $Na_2O + K_2O$ | 2 to <10 |
| $La_2O_3$ | 0.6 to 1, | and optionally at least one fining agent in an amount sufficient for fining; and wherein said at least one fining agent does not include any fluoride and said chemically resistant glass has a hydrolytic resistance in hydrolytic class 1, an acid resistance in acid class 1, a caustic lye resistance in lye class 1, a glass transition temperature ($T_g$) of at least 640° C. an a coefficient of thermal expansion ($\alpha_{20/300}$) of $4.1 \times 10^{-6}$ to $8.0 \times 10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

11. A composite glass-metal article made by fusing a piece of tungsten or molybdenum to a silicate glass, wherein said silicate glass having a high zirconium oxide content and a composition consisting of, in percent by weight based on oxide content:

| | |
|---|---|
| $SiO_2$ | 54 to 72 |
| $Al_2O_3$ | 0.5 to 7 |
| $ZrO_2$ | >10 to <12 |
| $B_2O_3$ | 0 to <5 |
| CaO | 3 to 11 |
| MgO | 0 to 10 |
| SrO | 0 to 8 |
| BaO | 0 to 12 |
| CaO + MgO + SrO + BaO | >5 to 24 |
| $Na_2O$ | 2 to <10 |
| $K_2O$ | 0 to 5 |
| $Na_2O + K_2O$ | 2 to <10 |
| $La_2O_3$ | 0 to 6 |
| $TiO_2$ | 0 to 4, | and optionally at least one fining agent in an amount sufficient for fining; and wherein either said $TiO_2$ is present in amounts greater than 0.1 percent by weight or said $La_2O_3$ is present in amounts greater than 0.1 percent by weight, said at least one fining agent does not include any fluoride and said silicate glass has a hydrolytic resistance in hydrolytic class 1, an acid resistance in acid class 3 or better, a caustic lye resistance in lye class 1, a glass transition temperature ($T_g$) of at least 640° C. an a coefficient of thermal expansion ($\alpha_{20/300}$) of $4.1\times10^{-6}$ to $8.0\times10^{-6}$/K, a refractive index ($n_d$) of 1.53 to 1.63, an Abbé number ($v_d$) of 47 to 66 and a negative anomalous partial dispersion in a blue spectral region ($\Delta P_{g,F}$) of up to −0.0130.

* * * * *